United States Patent
Sagoo

(10) Patent No.: US 11,989,477 B2
(45) Date of Patent: May 21, 2024

(54) TABLETOP DIGITAL MULTIMEDIA DISPLAY

(71) Applicant: Oongalee Technologies Inc., Edmonton (CA)

(72) Inventor: Amrit Sagoo, Edmonton (CA)

(73) Assignee: Oongalee Technologies Inc., Edmonton (CA)

( * ) Notice: Subject to any disclaimer, the term of this patent is extended or adjusted under 35 U.S.C. 154(b) by 0 days.

(21) Appl. No.: 18/046,026

(22) Filed: Oct. 12, 2022

(65) Prior Publication Data

US 2023/0115714 A1 Apr. 13, 2023

Related U.S. Application Data

(60) Provisional application No. 63/262,469, filed on Oct. 13, 2021.

(51) Int. Cl.
*G06F 3/14* (2006.01)
*H02J 7/00* (2006.01)

(52) U.S. Cl.
CPC .......... *G06F 3/1423* (2013.01); *H02J 7/0042* (2013.01)

(58) Field of Classification Search
CPC .. H02J 7/0042; H02J 50/10; H02J 7/00; H02J 7/0013; H02J 7/0044; H02J 7/0027; G06F 1/1616; G06F 1/1681; G06F 1/181; G09F 13/00; G09F 13/0413; G09F 23/00; G09F 13/0445; G09F 23/06; G09F 27/00
See application file for complete search history.

(56) References Cited

U.S. PATENT DOCUMENTS

| | | | | |
|---|---|---|---|---|
| 9,652,773 B1* | 5/2017 | Dublin, III | ............ | G02F 1/1336 |
| 10,720,783 B2* | 7/2020 | Allen | ............ | H02J 7/0044 |
| 2002/0141146 A1* | 10/2002 | Mustoe | ............ | G06F 1/1649 |
| | | | | 361/679.04 |
| 2006/0061984 A1* | 3/2006 | Wilson | ............ | A47F 10/06 |
| | | | | 362/431 |
| 2008/0123266 A1* | 5/2008 | Hung | ............ | A45D 42/00 |
| | | | | 361/679.06 |
| 2013/0041730 A1* | 2/2013 | LoBianco | ............ | G09F 13/00 |
| | | | | 40/538 |
| 2013/0057212 A1* | 3/2013 | Feuell | ............ | G06Q 30/0238 |
| | | | | 320/109 |

(Continued)

FOREIGN PATENT DOCUMENTS

CN 215867659 U * 2/2022

OTHER PUBLICATIONS

ELC Dual-Screen Digital Signage-WD1012T. (Jul. 20, 2021). https://global.elclcd.com/view/product/WD1012T.html (Year: 2021).*

*Primary Examiner* — Koosha Sharifi-Tafreshi
(74) *Attorney, Agent, or Firm* — DLA PIPER LLP (US)

(57) ABSTRACT

An example of an apparatus to provide content to a user is provided. The apparatus includes a base to rest on a surface. The apparatus further includes an energy storage device disposed within the base. In addition, the apparatus includes a charging device to couple with a portable electronic device of a user. The charging device is to transfer energy stored in the energy storage device to the portable electronic device. Furthermore, the apparatus includes a screen mounted on the base. The screen is to provide content to the user to engage the user.

16 Claims, 12 Drawing Sheets

(56) References Cited

U.S. PATENT DOCUMENTS

| | | | |
|---|---|---|---|
| 2013/0113421 A1* | 5/2013 | Han | H02J 7/02 |
| | | | 320/108 |
| 2013/0249467 A1* | 9/2013 | Varghese | H02J 7/0044 |
| | | | 320/103 |
| 2019/0005476 A1* | 1/2019 | Luo | G06F 1/1632 |
| 2019/0089176 A1* | 3/2019 | Dunn | H05K 5/0004 |

* cited by examiner

TABLETOP DIGITAL MULTIMEDIA DISPLAY

CROSS-REFERENCE TO RELATED APPLICATIONS

This application claims priority to U.S. Application No. 63/262,469, filed Oct. 13, 2021, which is herein incorporated by reference in its entirety.

BACKGROUND

In today's fast pace world, restaurants that offer a sit-down experience provide a place for restaurant patrons or users to enjoy a beverage or meal and escape the fast pace lifestyle for a moment. In many circumstances, people attend restaurants together for the purpose of socializing. While there are many service models for operating a restaurant, a restaurant experience generally involves being seated at a table where a waiter approaches the table to speak with the restaurant patrons. The server subsequently takes an order to be relayed back to the kitchen or bar where the food or beverage, respectively, is prepared. Once the food or beverage is prepared, the server takes the food or beverage to the patrons at the table. Once the patrons finish the food or beverage, the patrons of the restaurant typically call the server and settle the bill with the server. Depending on the restaurant as well as the behavior of the restaurant patrons, the restaurant experience may last for about half an hour to about three hours.

In many restaurants, the tables at which the restaurant patrons eat are not affixed to their respective locations. In addition, each table generally does not have a wired electrical connection unless significant renovations and electrical work are carried out in the restaurant. Accordingly, if restaurant patrons wish to connect to a network, the restaurant patrons generally use wireless devices connected to a wireless network, such as a WiFi network or a mobile phone network.

BRIEF DESCRIPTION OF THE DRAWINGS

Reference will now be made, by way of example only, to the accompanying drawings in which.

DETAILED DESCRIPTION

Figure 1:
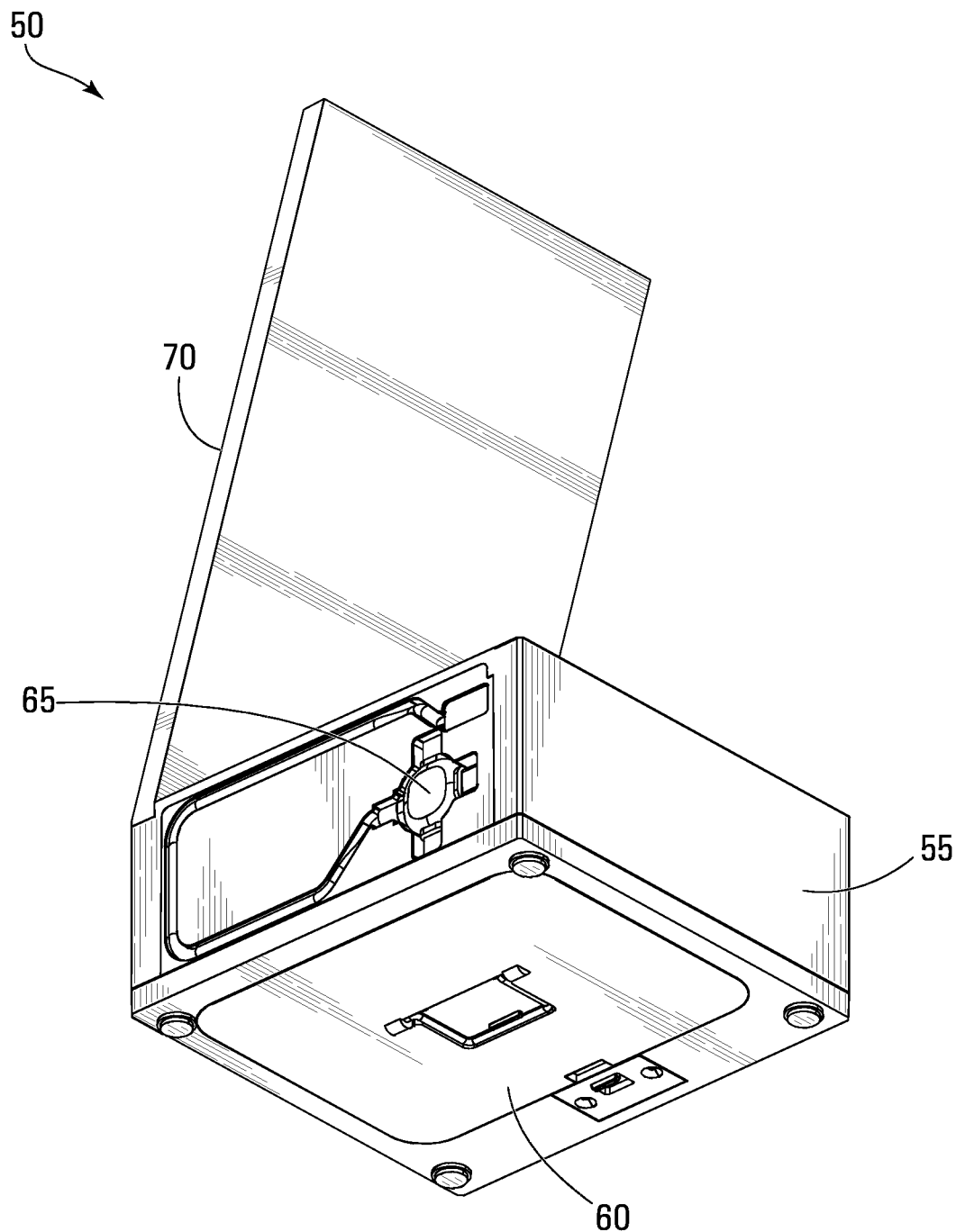
FIG. 1 is a perspective view of an example of an apparatus to provide content to a user.

As used herein, any usage of terms that suggest an absolute orientation (e.g. "top", "bottom", "up", "down", "left", "right", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Restaurant patrons and users may attend a restaurant to eat and socialize. While seated at a table in a restaurant, the users may order and eat food while socializing with other users or enjoy a form of entertainment, such as watching a sporting event on an overhead television screen. The tables in a restaurant are typically organized and spaced to increase the number of occupants within a space to allow for more users to be served at the same time, therefore increasing the revenue of a restaurant during peak hours. While some tables may be affixed to a floor or wall, tables are generally free standing to allow for rearrangement by the restaurant staff to accommodate parties of different sizes by putting tables together. Tables may also be moved or temporarily removed from a space to accommodate special events, such as a stage for live entertainment. Accordingly, it is generally a challenge to provide customized entertainment at each table since power sources are not readily provided at the table. In some examples, restaurant users may use their own portable electronic devices, such as smartphones, tablets, or laptops to receive and enjoy personal content at the table.

Entertainment in a restaurant is generally intended to increase the engagement of a user to increase the dwell time of each user at their respective table. By increasing the time each user spends at a table the likelihood that the user makes additional food and beverage purchases may also increases. In addition, the user may increase the quality of their time spent in the restaurant which may result in a better experience and increase the likelihood that a user may return to the restaurant.

In the examples provided herein, an apparatus is provided to deliver individualized content at a table to a user. The apparatus is a portable electronic device capable of being deployed to a table to provide content wirelessly. In addition, to further engage a user and improve the user experience, the apparatus includes a power source to provide charging capabilities to a user's portable electronic device. Providing charging capabilities to a user may further increase the user's dwell time and money spent by the user as the user may stay longer without fearing that their portable electronic device may run out of battery power, or if the user wants to charge a battery for use after leaving the restaurant. It is to be appreciated by a person of skill with the benefit of this description that although the present examples described herein are directed to restaurant uses, the apparatus may be used in many other locations to increase user engagement and/or dwell time. For example, the apparatus may be used in hotel rooms, lobbies, salons, casinos, waiting rooms/areas, etc.

Figure 2:
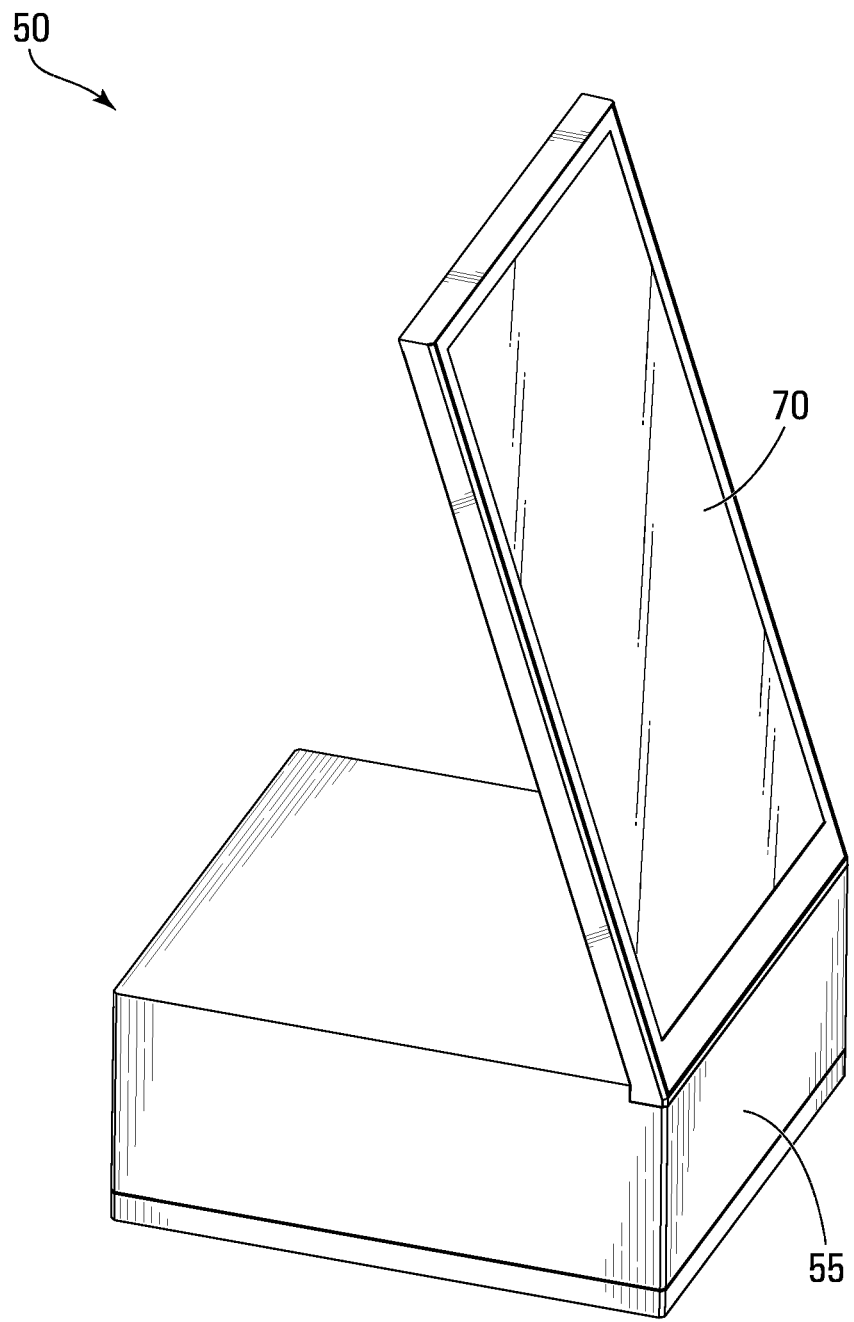
FIG. 2 is another perspective view of the apparatus of FIG. 1 to provide content to a user.

Referring to FIGS. 1 and 2, perspective views of an example of an apparatus to provide content to a user is generally shown at 50. The apparatus 50 may include additional components, such as various additional interfaces and/or input/output devices such as indicators, buttons, and switches to interact with the user of the apparatus 50. In the present example, the user may be a patron of a restaurant. The interactions may include selecting content, communicating with another device, or operating the apparatus 50. In the present example, the apparatus 50 is to provide digital multimedia content to the user. The apparatus 50 may also communicate with other devices, such as a controller or central server to place orders, to get the attention of a waiter, or to settle a bill. In the present example, the apparatus 50 includes a base 55, an energy storage device 60, a charging device 65, and a screen 70.

The base 55 is to rest on a surface, such as a tabletop or any other substantially flat surface. The base 55 is not particularly limited. For example, the base 55 may be a unitary body with cavities to store other components of the apparatus 50. In particular, the base 55 may be made from material and components that includes substantial weight to provide support for the apparatus 50 and to rest on the surface. In some examples, the base 55 may include friction pads, such as rubber feet to reduce the chance of sliding along the surface.

It is to be understood that the material of the base 55 is not particularly limited to any material and that several different types of materials are contemplated. In addition, the base 55 may be made from different materials such that different portions may have different properties. For example, the base 55 may have an exterior housing that is made from plastic, metal, or another substantially rigid material that may be water resistant and easy to clean. Accordingly, the base 55 may provide a casing for sensitive electronics of the apparatus 50 to protect from spills, grease, or other things that may be spilled onto the surface or directly onto the apparatus 50. Between uses, the apparatus 50 may then be cleaned and sanitized with a wipe or with detergents used to clean the surface on which the base 55 rests between different groups of customers.

In the present example, the energy storage device 60 is to store energy to power the apparatus 50 as well as to provide energy to charge a portable electronic device. In the present example, the energy storage device 60 is disposed within the base 55. The energy storage device 60 is not particularly limited and may be any type of battery capable of providing sufficient energy. For example, the energy storage device 60 may be a lithium ion battery, a nickel-cadmium battery, or other type of rechargeable battery. In some examples, the energy storage device 60 may include disposable alkaline batteries. In the present example, the energy storage device 60 may provide power via a direct current of about 5.0 V with a maximum current of about 2.0 A. Furthermore, the energy storage device 60 may have a capacity of about 20,800 mAh in some examples, which will have the ability to charge about five smartphones completely. In other examples, the energy storage device 60 may have a capacity higher or lower depending on the specific application, such as how long the apparatus 50 is intended to be deployed between charging.

The energy storage device 60 may be detachable from the base 55. Accordingly, the energy storage device 60 may be held in place with a latch or clip. By providing a detachment mechanism for the energy storage device 60, it is to be appreciated by a person of skill with the benefit of this description that the energy storage device 60 may be exchanged or serviced easily. In some examples, the energy storage device 60 may also be charged with an external charging device such that the apparatus 50 may continue to operate with a new energy storage device 60. In other examples, the energy storage device 60 may be encased within the base 55 such that the energy storage device 60 is not a serviceable component. The energy storage device 60 may be charged by connecting the apparatus 50 to a power source. In the present example, the apparatus 50 may then provide power to the energy storage device 60 at about 12.0 V with a current up to 2.0 A.

The charging device 65 is to couple with a portable electronic device (not shown). In the present example, the charging device 65 is in electrical communication with the energy storage device 60. The charging device 65 is configured to transfer the energy stored in the energy storage device 60 to the portable electronic device coupled to the charging device 65. The charging device 65 is not particularly limited and may include a physical connector, such as a Lightning connector or a universal serial bus connector (e.g. USB-A, mini-USB, micro-USB, USB-C, etc.). In the present example, the charging device 65 includes multiple connectors to increase compatibility with different portable devices. In other examples, the charging device 65 may be a wireless charging device, such as an inductive charger. The type of wireless charging device is not particularly limited and may be a device using a Qi standard for wireless charging. It is to be appreciated by a person of skill with the benefit of this description that the apparatus 50 may include multiple charging devices 65 to increase compatibility with different portable electronic devices.

By providing the charging device 65, the apparatus 50 allows for a user to charge their portable electronic device, such as a mobile phone, tablet, or other device. Since the user may want to add a more energy to the battery of their device, the user may be incentivized to stay close to the apparatus 50. Since the apparatus 50 is placed on a table of a restaurant in the present example, the user may be incentivized to remain at the restaurant and to spend more money, either through interactive content presented on the apparatus, as discussed in greater detail below, or by ordering more food and beverages from the restaurant.

The screen 70 is mounted to the base 55 and configured to provide content to the user in general. The manner by which the screen 70 is mounted to the base 55 is not particularly limited. For example, the screen 70 may be fastened with fasteners, such as a screw, clipped onto the base 55, or embedded in part of a unitary body. In the present example, the screen 70 is angled for easier viewing by a user whose eye level may be significantly higher than the surface on which the apparatus 50 rests.

The screen 70 is not particularly limited and may be any type of screen capable of providing content to the user. In the present example, the screen is a liquid crystal flat panel display. In other examples, the screen 70 may include one or more light emitters such as an array of light emitting diodes (LED), liquid crystals, plasma cells, or organic light emitting diodes (OLED). Furthermore, the screen 70 may also be a touchscreen to receive input from the user in some examples. For example, the screen 70 may include a touch membrane that may include resistive technology, surface acoustic wave technology, capacitive technology, infrared technology, or optical imaging technology to detect input from the user.

The content provided to the user by the screen 70 is not particularly limited and may be set by the owner of the apparatus 50, such as the restaurant management. In some examples, the content may be marketing material that may or may not be targeted to the user. The marketing material may include image advertisements that cycle through a predetermined set of images that are either stored in the apparatus 50 or streamed to the apparatus 50. In other examples, the marketing material may include short clips and videos shown to the user. The source of the marketing material is not particularly limited and may include content generated by the restaurant or content received from a third party marketing source delivered via servers or via a storage media device. Furthermore, the marketing material may include links or QR codes for the user to obtain more information or to purchase a product or service. In other examples, the content may be live content streamed to the screen 70, such as a sporting event, news, or other events.

In examples where the user can provide input, such as when the screen 70 is a touchscreen, or when the user can submit information via an app on their portable electronic device, the content provided to the user may include interactive content. For example, the content may be games or a gambling app to allow the user to engage in an activity to maintain the engagement level of the user. For example, the user may be placing bets or playing online games with other users. In further examples, the content may be content associated with the restaurant, such as information about a meal or suggestions of food or beverage pairings. The content may also be used to prompt the user to provide information for collecting information about the user, which may then be used to provide targeted information.

It is to be appreciated by a person of skill in the art with the benefit of this description that the screen 70 may be used to provide multiple different types of content. In some examples, the user may switch between the different types of content and the apparatus may suggest additional content to engage the user with a goal of increasing the amount of money spent by the user at the restaurant.

Figure 3:
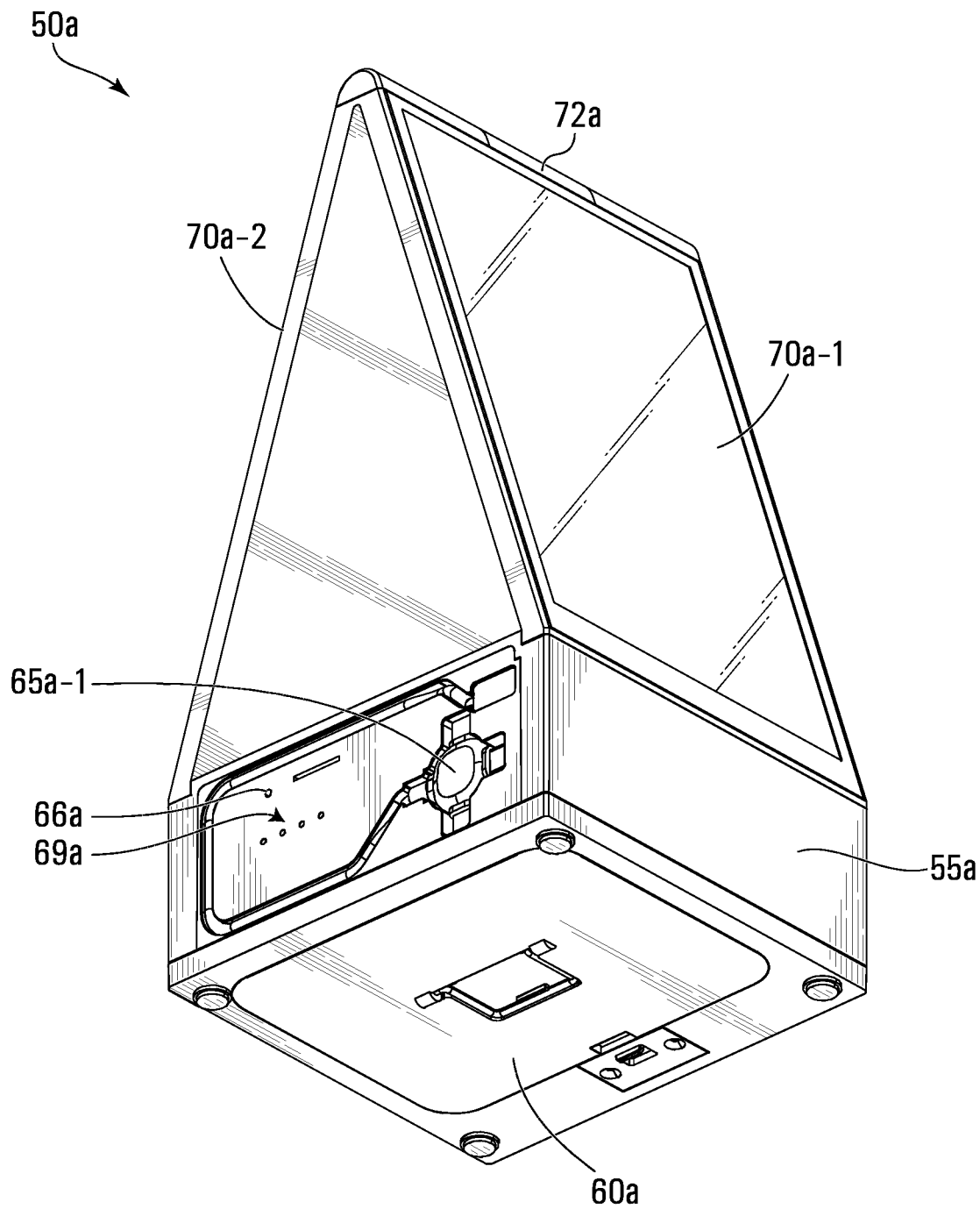
FIG. 3 is a perspective view of another example of an apparatus to provide content to a user.
Figure 4:
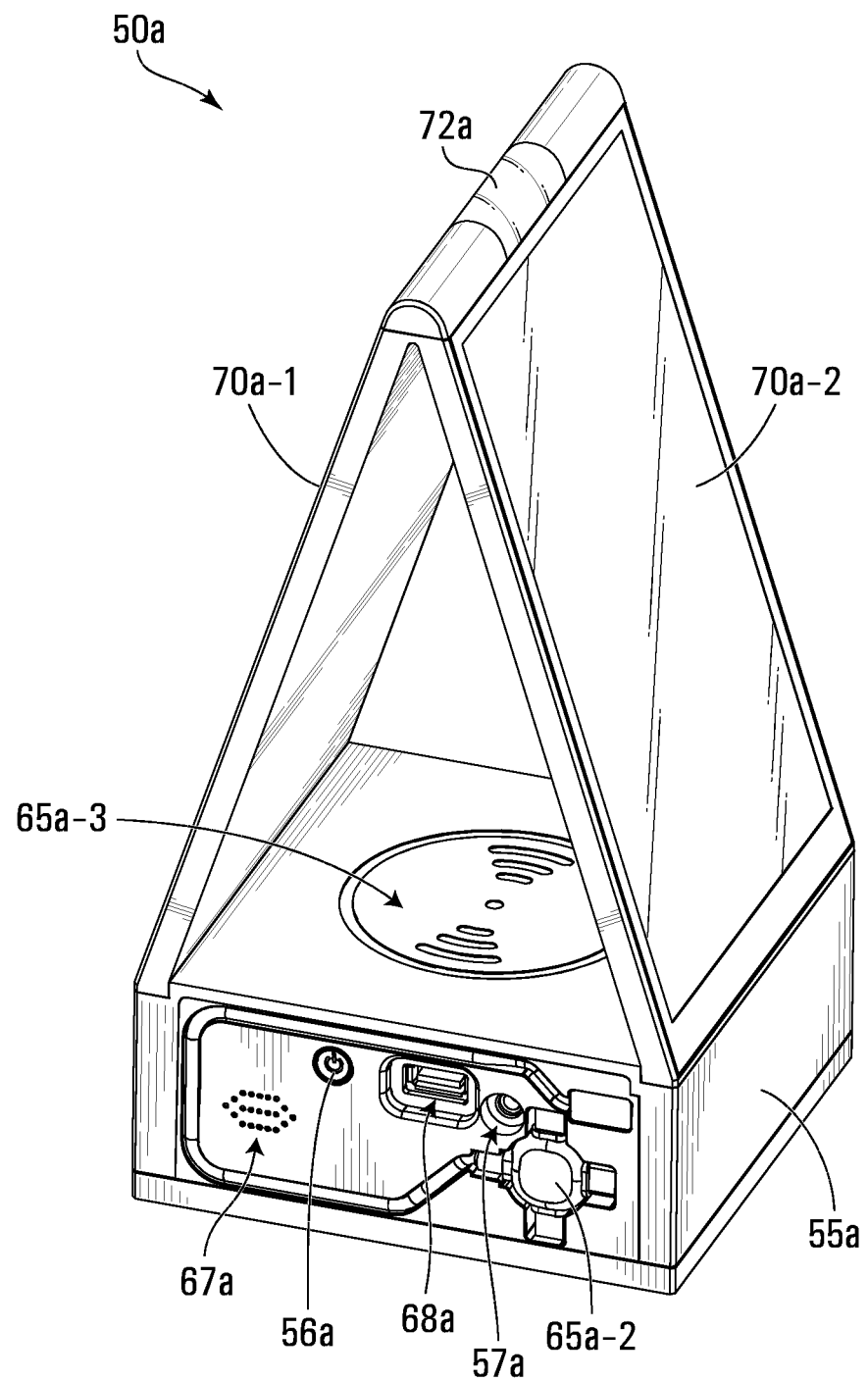
FIG. 4 is another perspective view of the apparatus of FIG. 3 to provide content to a user.

Referring to FIGS. 3 and 4, perspective views of another example of an apparatus to provide content to a user is generally shown at 50a. Like components of the apparatus 50a bear like reference to their counterparts in the apparatus 50, except followed by the suffix "a". In the present example, the apparatus 50a is to provide digital multimedia content to multiple users seated at a table on both sides of the apparatus 50a. The apparatus 50a may also communicate with other devices, such as a controller or central server to place orders or to get the attention of a waiter. In the present example, the apparatus 50a includes a base 55a, an energy storage device 60a, charging devices 65a-1, 65a-2, 65a-3 (generically, these charging devices are referred to herein as "charging devices 65a" and collectively as "charging devices 65a"), a first screen 70a-1, a second screen 70a-2 (generically, these screens are referred to herein as "screen 70a" and collectively as "screens 70a"), and an indicator light 72a.

In the present example, the base 55a includes further features to interact with a user to increase engagement. For example, the base 55a may include a physical button 56a to receive input from a user. The button 56a is not limited and may be a power button in the present example. In other examples, the button 56a may be used to control other features, such as switching operating modes and content, controlling the screen settings or other settings of the apparatus 50a. It is also to be appreciated by a person of skill with the benefit of this description that although only a single button 56a is shown, more buttons may be disposed on the base 55a. For example, the base 55a may include a number pad for user input. The base 55a also includes a connector 57a to receive direct current power for charging the energy storage device 60a such that the energy storage device 60a may be charged without removal from the base 55a. In addition, the connector 57a may allow for the apparatus 50a to operate in a powered mode without an energy storage device. In the present example, the connector 57a is to receive a direct current from an inverter providing a voltage of about 12.0 V with a maximum current of 10.0 A. In other examples, the power may be received at different voltages with different current limits. In further examples, the apparatus 50a may also include an inverter and the power can be received directly from a power outlet.

The base 55a further includes a microphone 66a to detect sounds, which may allow for the apparatus 50a to receive voice commands from the user. The microphone 66a may also be used to detect the presence of a user to operate a power saving feature, such as dimming the screens 70a. In addition, the base 55a includes a speaker 67a to generate sounds. The sounds may be associated with the content provided to the user or the sound may be an alert for the user or a waiter in the restaurant. Furthermore, the base 55a may include a data connector 68a. The data connector 68a may be a universal serial bus connector (e.g. USB-A, mini-USB, micro-USB, USB-C, etc.) to transfer data, such as content or application data to and from the apparatus 50a. In some examples, the apparatus 50a may limit the data transfer via the universal serial bus connector to maintain privacy of the data on the portable electronic device. For example, the apparatus 50a may prompt a user of the portable electronic device for permission prior to any data transfer.

Figure 5A:
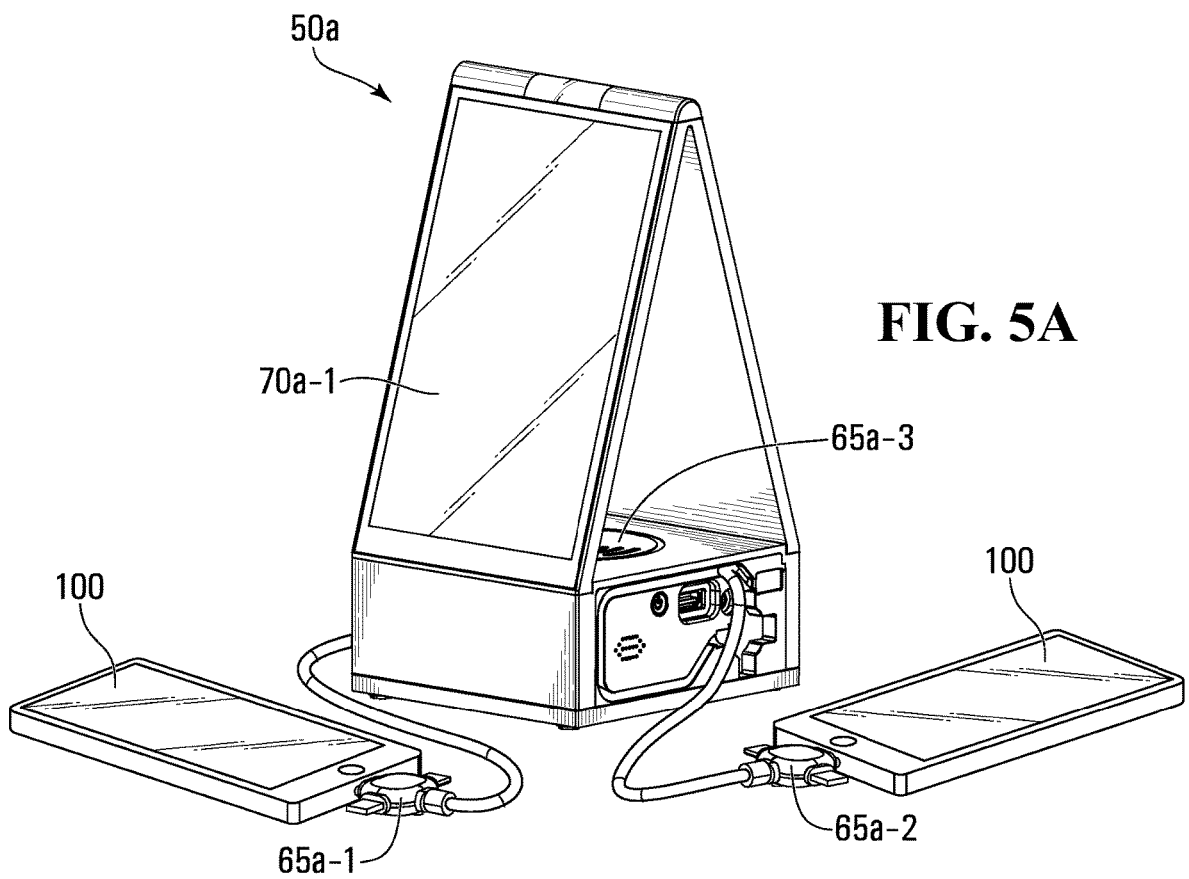
FIG. 5A is a view of the apparatus of FIGS. 3 and 4 connected to two portable electronic devices for charging.
Figure 5B:
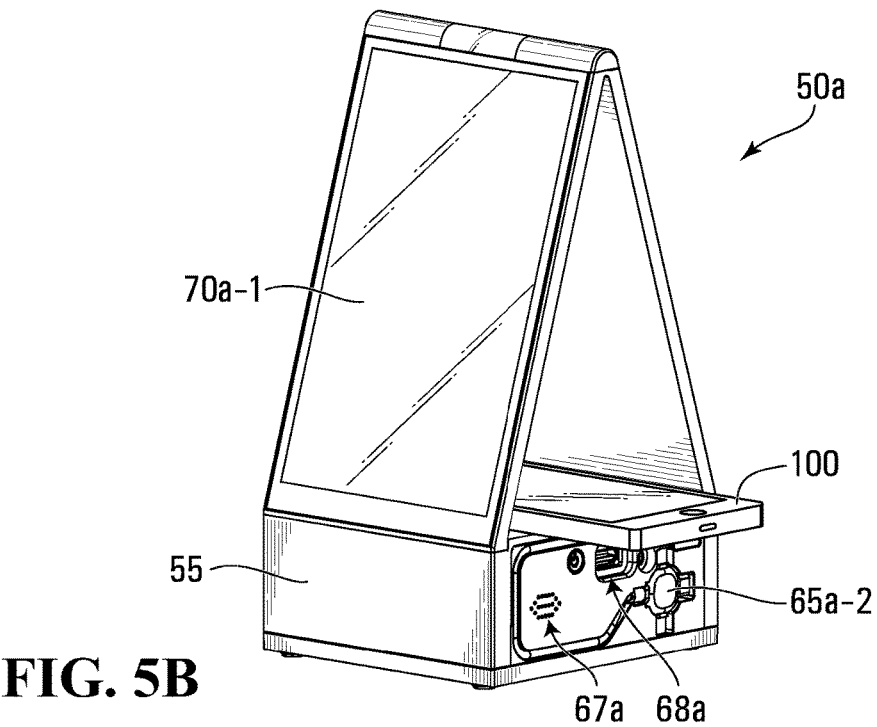
FIG. 5B is a view of the apparatus of FIGS. 3 and 4 coupled to a portable electronic device for charging via a wireless charger.

The charging devices 65a are to couple with a portable electronic device (not shown). In the present example, the charging devices 65a are in electrical communication with the energy storage device 60a. The charging devices 65a are configured to transfer the energy stored in the energy storage device 60a to the portable electronic device coupled to the charging device 65a. In the present example, the charging device 65a-1 includes multiple physical connectors. In particular, the charging device 65a-1 includes a Lightning connector, a mini-USB connector, and a USB-C connector. The charging device 65a-2 is substantially similar to the charging device 65a-1 and provides additional connectors to which multiple portable electronic devices 100 may be connected as shown in FIG. 5A. The charging device 65a-3 is a wireless charging device to provide an inductive charging for a portable electronic device as shown in FIG. 5B. The type of wireless charging device is not particularly limited and may be a device using a Qi standard for wireless charging.

In the present example, the apparatus 50a includes multiple screens 70a mounted to the base 55a. The screens 70a may face different directions to allow for users at different angles to view content provided on the screens 70a. The manner by which the screens are arranged is not particularly limited. In the present example, the screens 70a are facing opposite directions to allow at least one of the screens 70a to be visible from almost any position about the apparatus 50a. Furthermore, the bottom edge of each screen 70a may be connected to opposite edges of the base 55a and connected along the top edges of each screen 70a to form a triangular hole with the base 55a. In the present example, the triangular hole may also provide an additional support for carrying the device. In particular, the screens 70a may be sufficiently rigid to support the weight of the apparatus 50a such that the apparatus 50a may hang if a support, such as an arm or bar, is extended therethrough. It is to be appreciated by a person of skill with the benefit of this description that in other examples, the configuration of the screens 70a may be varied. For example, the base 55a may have a different form factor, such as a circular shape.

The content provided to the user by the screens 70a is not particularly limited and may be set by the owner of the apparatus 50a, such as the restaurant management. In some examples, the content may be marketing material that may or may not be targeted to the users. The screens 70a may also be synchronized in some applications to display the same content. In other examples, the screens 70a may be providing different content that may be selected by a user. For example, if two users at a table want to view different live content, the screens 70a may be set to different channels to provide different content.

The indicator light 72a is to provide an alert to an observer. The indicator light 72a is not limited and may include any light source. For example, the indicator light may be a light emitting diode (LED). The alert is not particularly limited and the observer for which the alert is intended is not particularly limited. For example, the indicator light 72a may be disposed above the screens 70a to be readily visible by multiple observers, such as the waiters in the restaurant. For example, indicator light 72a may be operated by a user input to request service from a waiter. In other examples, the indicator light 72a may illuminate to indicate an error or low battery status where the waiter may replace the apparatus 50a at a table. In other examples, the indicator light 72a may alert a user at the table while interacting with content on the apparatus, such as if the user wins a game. It is to be appreciated by a person of skill with the benefit of this description that the indicator light 72a may also be operated to provide different colors to correspond with different alerts.

In summary, the present example provides an apparatus 50a with two screens 70a which are liquid crystal flat panel touchscreen displays are mounted on opposite sides a plastic housing of the base 55a. In the present example, it is to be appreciate that the base 55a houses a motherboard and an energy storage device 60a to allow the apparatus 50a to maintain operation and provide charging capabilities for external portable electronic devices 100. On the top surface of the base 55a, located in between the screens 70a, the charging device 65a-3, which is an induction charging plate, is provided. Mounted on either side of the base 55a are two additional charging devices 65a-1 and 65a-2, which are tri-tipped (Apple Lightning, Micro-USB and USB-C) charging cables. An additional data connector 68a, which is a USB port may also be used to power additional devices. The apparatus 50a also provides access to the energy storage device 60a via the underside of the base 55a in the present example. The apparatus 50a may be used to display images, video, interactive and streaming content.

The applications for which the apparatus 50a may be used is not particularly limited. For example, the apparatus 50a may provide a double-sided digital signboard in which the screens 70a are mounted on either side and connected to the base 55a that contains the computer systems and power to maintain operations. The apparatus 50a may rest on a tabletop to be configured to display interactive items on the screens 70a, which may be touchscreens to receive user input. The screens may also provide static images or video.

The content displayed on the screens 70a may be cached within an internal memory of the apparatus 50a or downloaded and streamed live through a network connection, such as WiFi. This content provided to users is, in most cases, internal and external advertising and items such as digital menus and interactivity options with the business deploying the apparatus 50a. In the present example, the screens 70a can range from about 300 to about 1080 nit high-resolution LCD panels with touch sensitivity and a native resolution of 1080×1920. In addition, the screens 70a are encased in plastic, angled to meet at the top edge of each screen 70a, providing a more precise view when placed on a surface.

The base 55a is molded in plastic, contains multiple items for use in the operation of the screens 70a, and provides the power and charging devices 65a for use in charging portable electronic devices 100, such as phones and other mobile devices. The charging device 65a-3 is an induction charging plate located between the two screens 70a on top of the base 55a. The induction charging plate is housed within the base 55a and secured to the top inside of the base 55a to generate electromagnetic waves that permeate through the plastic molding to charge the portable electric device 100 with a complimentary receiving connector. Allowing this wireless charging capability increases the number of portable electronic devices that can receive charging at one time by the apparatus 50a.

One side of the base 55a provides a charging device 65a-1, which includes two multi-tip charging cables located on the apparatus 50a. A flexible cable delivers power to devices that utilize USB-C, Mini-USB, or Apple Lightning connectors. The plastic molding is shaped so the cable will fit into a shaped groove along the side of the base 55a to store the charging device 65a-2 when not in use. In the present example, the charging cable is removable and can be replaced if damaged. The manner by which the charging cable connects to the internals of the base 55a is not limited and may be through any suitable connector, such as a micro-USB or USB-C connector. In addition, a standard USB 3.0 port is located on the same side that provides power to any connecting device in addition to the provided cable connector. Control of the power on and off function of the apparatus 50a is through the molded button 56a on this side of the base 55a, located to the left of the USB 3.0 port. Pressing the button 56a will power the unit on; once operational, pressing it again will trigger an onscreen instruction to control the powering down of the unit. Holding the button 56a down while in use will perform a hard power down. The speaker 67a provides sound through the holes on this side of the base 55a. The power connector 57a on this side of the base 55a charges the removable battery pack or provide power to the apparatus 50a for operation from a wall outlet through wired power connection.

There is an additional charging device 65a-2, which is a substantially similar flexible corded three-tipped charging cable on the opposite side of the base described above. This cable has USB-C, micro-USB and Apple Lightning connectors to charge major devices. When not in use, the cable and tip are held in the molded cable and tip holder. The manner by which the charging cable connects to the internals of the base 55a is not limited and may be through any suitable connector, such as a micro-USB or USB-C connector. The apparatus 50a also includes status lights 69a, which are LED lights on this side of the base 55a to indicate a battery status based on the charge level of the energy storage unit device 60a, which may be a battery pack. The LED lights are not limited and may be controlled by a separate microprocessor measuring the voltage of the energy storage unit device 60a. In other examples, the LED light may be part of the energy storage device 60a. In the present example, four lit lights indicate a full charge, and zero or one indicates no or low charge. These status lights 69a will also illuminate, in sequence, as the battery pack is charging from a wall outlet.

On the underside of the base 55a is access to the removable energy storage device 60a. A spring-loaded tab holds the energy storage device 60a securely in place during operation. Removal of the energy storage device 60a involves pulling back the spring-loaded tab and pulling the metal clip on the energy storage device 60a, causing the energy storage device 60a to undock from the base 55a. On the four corners of the base 55a are rubber feet to provide grip and raise the components located within the base off of the surface, limiting the possibility of damage from spills.

Figure 6:
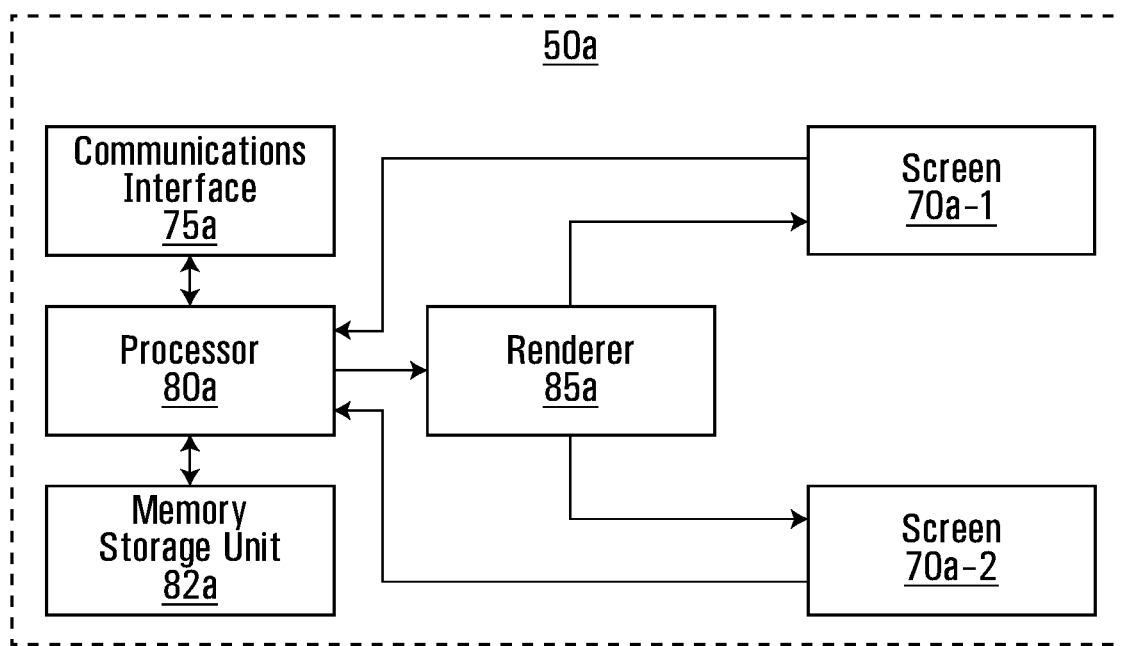
FIG. 6 is a schematic representation of the components of the apparatus of FIGS. 3 and 5.

Referring to FIG. 6, a schematic representation of an example of the internal components of the apparatus 50a is generally shown. The apparatus 50a may include additional components, such as various input and output devices to interact with the user as well as additional processors and/or memory storage units. In the present example, the apparatus 50a further includes a communications interface 75a, a processor 80a, a memory storage unit 82a, and a renderer 85a. Although the present example shows the renderer 85a as a separate component from the processor 80a, in other examples, the renderer 85a may be part of the processor 80a and share common hardware components.

The communications interface 75a is to transmit signals to an external device as well as to receive signals from an external device. The external device with which the signals are transmitted to and received from is not limited. For example, the communications interface 75a may communicate with a central server that manages a plurality of apparatuses 50a. The central server is not particularly limited and may be any electronic device capable of managing the plurality of apparatuses 50a. For example, the central server may be a laptop computer, desktop computer, tablet, a smartphone, etc. The manner by which the communications interface 75a transmits and receives the signals is not particularly limited. For example, the communications interface 75a may transmit the signals over a wireless network such as WiFi or Bluetooth. In some examples, the central server may be a cloud server to manage the electronic content for distribution to a plurality of apparatuses 50a as well as a management device to control the distribution of the content. The management device is not particularly limited and may be a smartphone executing an application in communication with the central server.

The signals received by the communications interface 75a may include control commands. Control commands may include commands issued by the central server to direct the apparatus 50a to carry out a specific operation. For example, a control command may cause an apparatus 50a to reboot, such as if the users left the table. Other commands may cause the apparatus 50a to display a message for a user or to implement a payment process at the end of the meal.

The signals received by the communications interface 75a may include content to provide the user to increase engagement. For example, the content may be interactive content where the user is encouraged to provide input. The manner by which the user provides input is not limited and may involve receiving input on the apparatus 50a. In other examples, the interactive content may provide a link or QR code for a user to enter into their own smartphone to provide input. In other examples, the content may be live content to be displayed to the user. For example, live content may include broadcasts such as sporting events or news programs. In further examples, the content may be on demand content selected from a library of content stored locally on the memory storage unit 82a or in a central server.

The signals transmitted by the communications interface 75a are not particularly limited. For example, the signals may include input received from the user of the apparatus 50a, such as requests for content or input in response to interactive content provided to the user, to be transmitted to the central server. The input may then be processed by the central server which may adjust the content provided to the user or continue providing interactive content based on the response. In other examples, the input from the user may represent a call for service or to request food or beverage. In this example, the apparatus 50a may have an ordering application that allows a user to submit an order for food and beverage to the kitchen, or to dispatch a waiter to the table at the request of the user.

The processor 80a may include a central processing unit (CPU), a microcontroller, a microprocessor, a processing core, a field-programmable gate array (FPGA), an application-specific integrated circuit (ASIC), or similar. The processor 80a may cooperate with the memory storage unit 82a to execute various instructions stored thereon. For example, the memory storage unit 82a may store an operating system that is executable by the processor 80a to provide general functionality to the apparatus 50a, including functionality to run various applications to provide content and to receive input from a user.

The memory storage unit 82a is to store data received via the communications interface 75a as well as application data generated during the operation of the apparatus 50a. In addition, the memory storage unit 82a may store data collected from the user to be subsequently used for targeted marketing purposes. For example, the memory storage unit 82a may store cookies collected during use that can provide information about the users and their habits.

In the present example, the memory storage unit 82a may include a non-transitory machine-readable storage medium that may be any electronic, magnetic, optical, or other physical storage device. In other examples, the memory storage unit 82a may be a cloud service providing content. The memory storage unit 82a may also be used to store instructions for general operation of the apparatus 50a. In particular, the memory storage unit 82a may store an operating system that is executable by a processor 80a to provide general functionality to the apparatus 50a, for example, functionality to support various applications. The memory storage unit 82a may additionally store instructions to operate the renderer 85a. Furthermore, the memory storage unit 82a may also store control instructions to operate other components and peripheral devices of the apparatus 50a, such as additional user interfaces, energy management of the energy storage device 60a, and the other input and output devices.

In the present example, the renderer 85a is to render content on the screens 70a. The manner by which the content is rendered is not particularly limited. For example, the renderer 85a may communicate with the hardware of the screens 70a to ensure the images and video fit on the screens 70a and that the aspect ratio and image quality are suitable. For example, the renderer 85a may adjust the resolution and crop the image or video to fit the screens 70a.

Figure 7:
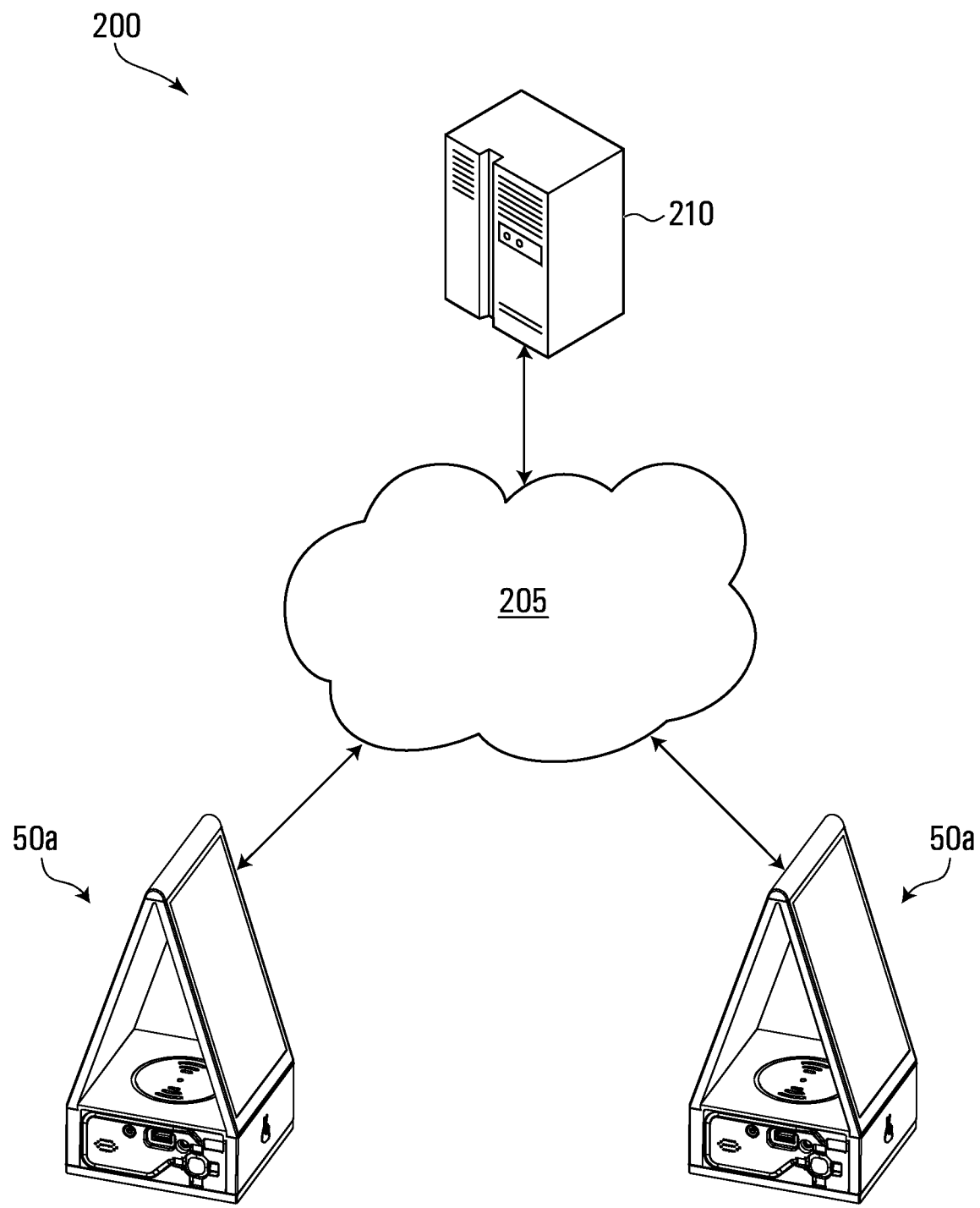
FIG. 7 is a schematic representation of a system to provide content to a user from a central server.

Referring to FIG. 7, an example of a system 200 of various apparatuses 50a deployed in a restaurant with a central server 210 is generally shown. In the present example system 200, the central server 210 is in communication with the apparatuses 50a via a network 205. It is to be appreciated by a person of skill that the network 205 is not particularly limited and may be any wireless network connecting the central server 210 to the apparatuses 50a.

The central server 210 is to transmit content to each apparatus 50a and to receive data from each apparatus 50a. The content provided to the apparatus 50a may include interactive content which may generate user input at the apparatus 50a in response to the content. Since the user is providing input, the interactive content engages the user to prolong the time that the user will stay at the apparatus 50a. In other examples, the central server 210 may receive video or content feeds from external sources, such as a cable provider, to provide live content, or content streaming service to provide on-demand content. The central server 210 may relay selected content to each apparatus 50a which may be pushed down to each apparatus 50a or in response for content from a user operating the apparatus 50a.

The central server 210 may also be in communication with other systems of the restaurant to integrate operations. For example, the central server 210 may be connected to a point of sale system capable of receiving payment details from a user. Accordingly, when the user is ready to leave, the user may pay for the purchases at the apparatus 50a using a payment application. For example, the user may be able to enter payment data, such as a credit card number, for processing by the point of sale system to settle a bill. In some examples, the central server 210 may also operate a point of sale system such that the whole transaction may be carried out at the central server 210.

In other examples, the central server 210 may also be connected to an ordering system of a restaurant. In this example, the apparatus 50a may run an ordering application that interacts with a user. For example, the ordering application may provide a menu and options from which the user may select food and beverage items. The selections from the user may be entered into the apparatus 50a through the screens 70a as order data which is to be transmitted to the central server 210. The central server 210 may then send the order to the kitchen or appropriate resources to prepare the food and beverages.

Figure 8A:
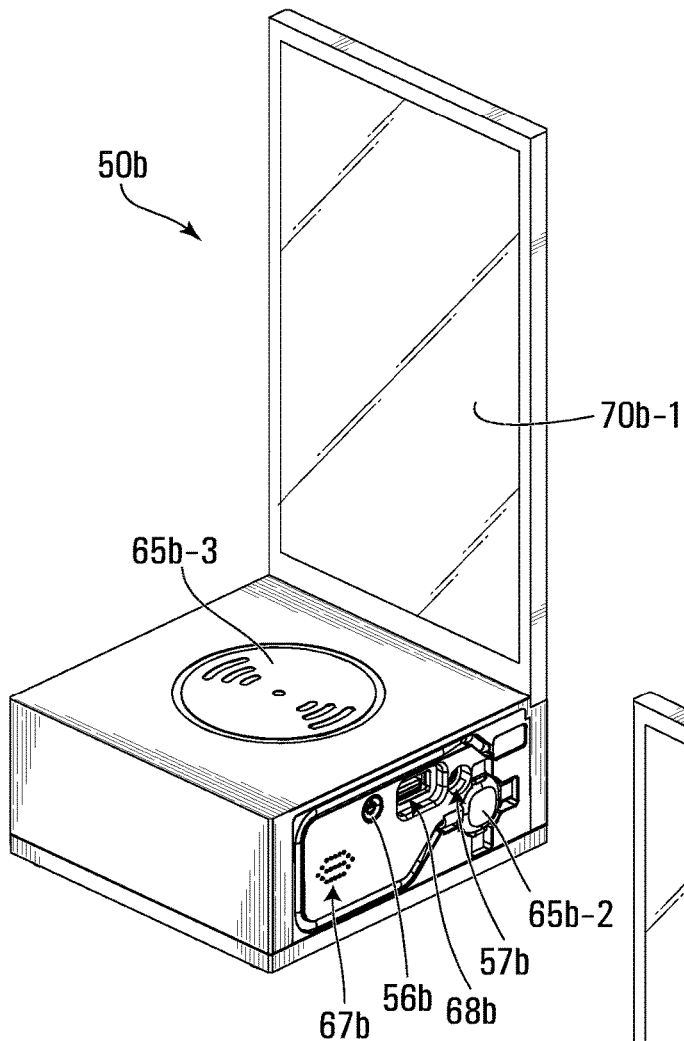
FIG. 8A is a perspective view of another example of an apparatus to provide content to a user.
Figure 8B:
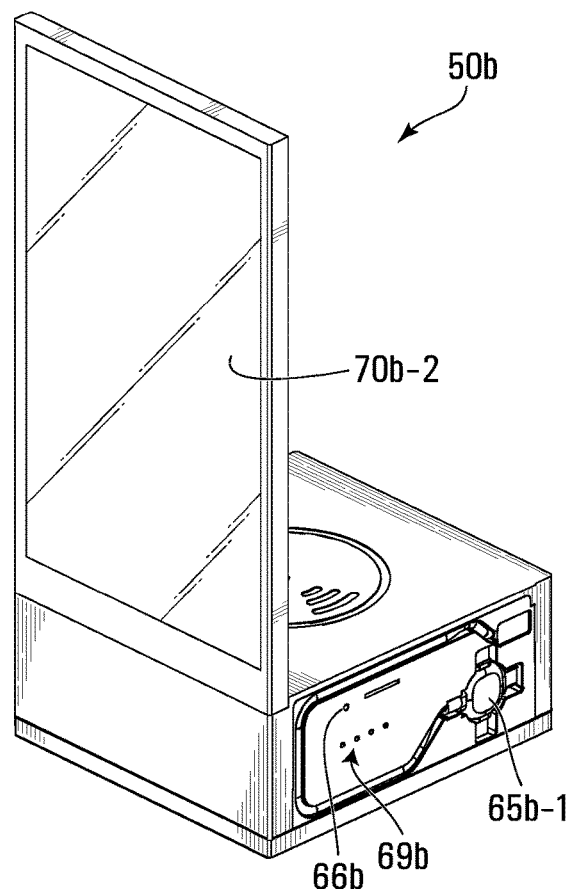
FIG. 8B is another perspective view of the apparatus of FIG. 8A to provide content to a user.

Referring to FIGS. 8A and 8B, perspective views of another example of an apparatus to provide content to a user is generally shown at 50b. Like components of the apparatus 50b bear like reference to their counterparts in the apparatus 50a, except followed by the suffix "b". In the present example, the apparatus 50b is to provide digital multimedia content to multiple users seated at a table on both sides of the apparatus 50b. The apparatus 50b may also communicate with other devices, such as a controller or central server to place orders or to get the attention of a waiter. In the present example, the apparatus 50b includes a base 55b, an energy storage device 60b, charging devices 65b-1, 65b-2, 65b-3, a first screen 70b-1, and a second screen 70b-2. In the present example, the base 55b also include a button 56b, a connector 57b, a microphone 66b, a speaker 67b, a data connector 68b, and status lights 69b. As shown, the screen 70b-1 and the screen 70b-2 are vertically oriented along one edge of the base 55b and oriented back to back.

Figure 9:
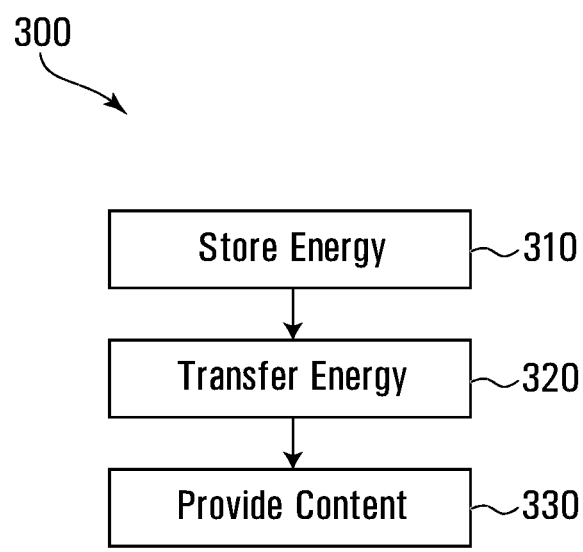
FIG. 9 is a flowchart of an example of a method of providing content to a user.
Figure 10B:
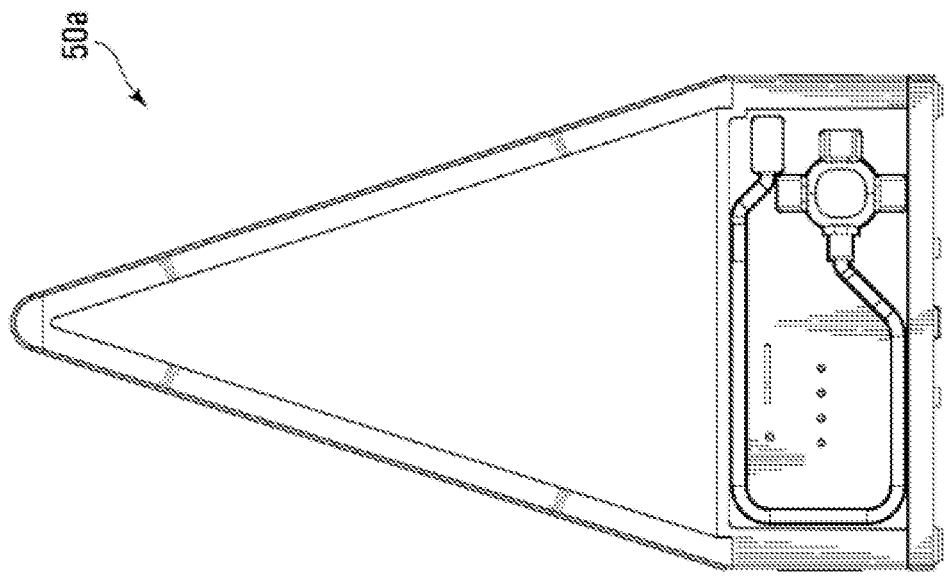
FIG. 10B is a second side view of the apparatus of FIG. 10A.
Figure 10A:
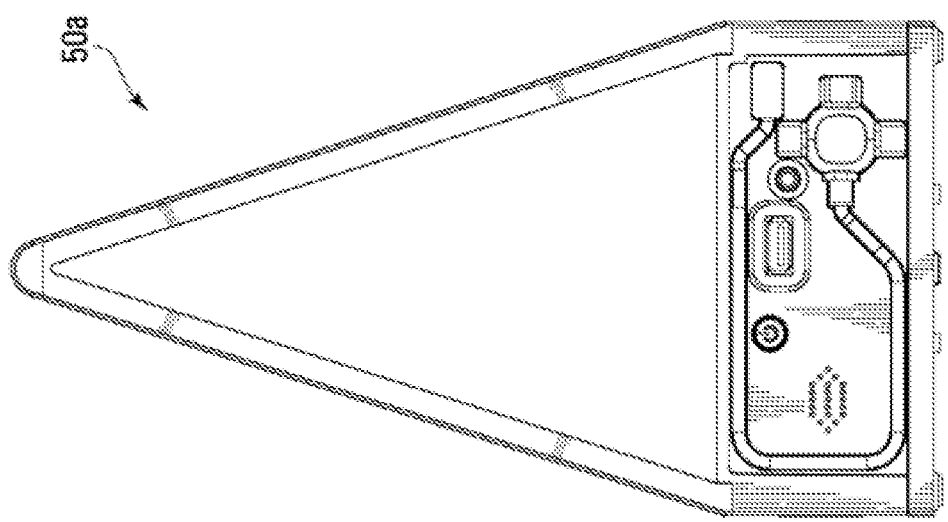
FIG. 10A is a first side view of an example of an apparatus to provide content to a user.
Figure 10D:
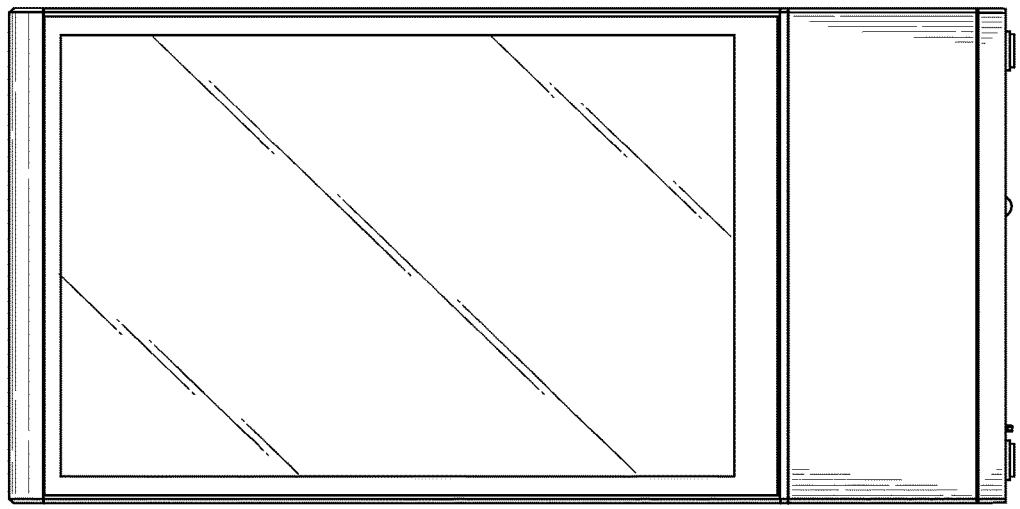
FIG. 10D is a back side view of the apparatus of FIG. 10A.
Figure 10C:
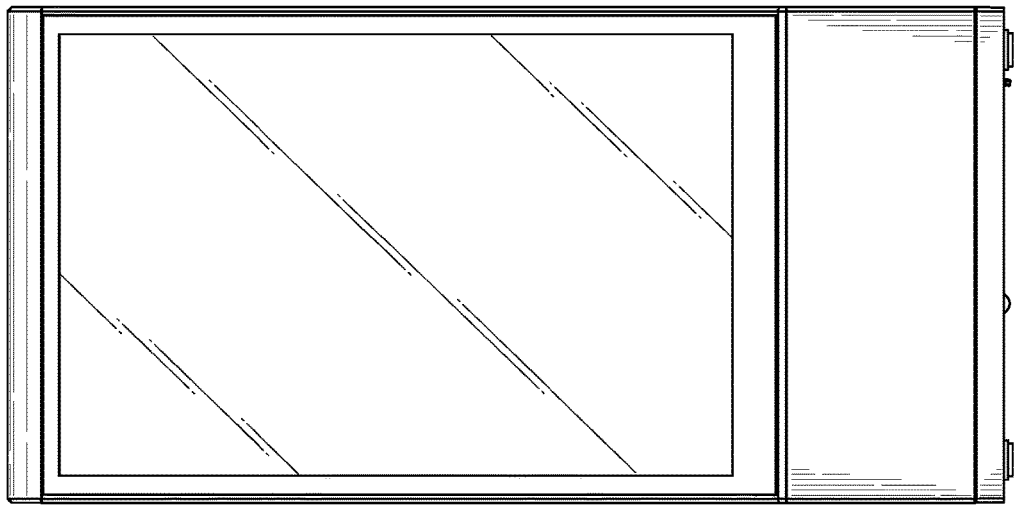
FIG. 10C is a front side view of the apparatus of FIG. 10A.
Figure 10F:
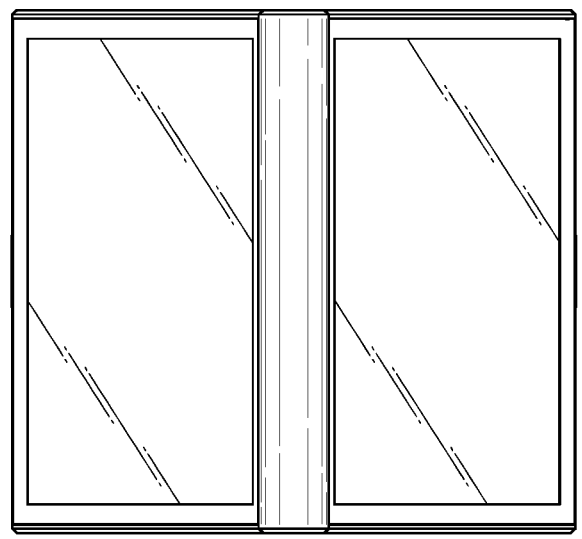
FIG. 10F is a bottom side view of the apparatus of FIG. 10A.
Figure 10E:
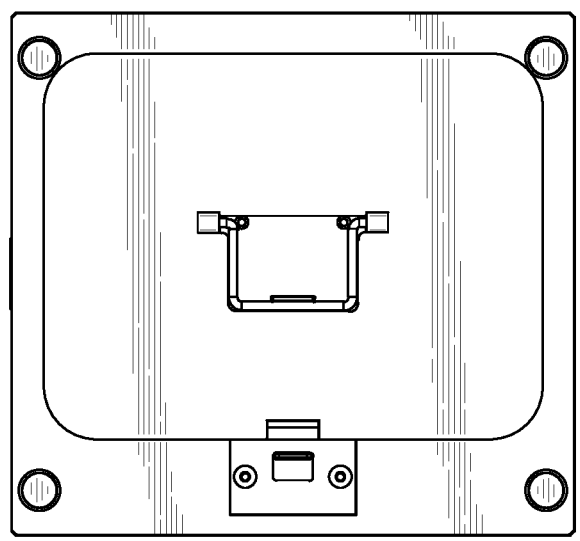
FIG. 10E is a top view of the apparatus of FIG. 10A.

Referring to FIG. 9, a flowchart of an example method of engaging a user in a restaurant is generally shown at 300. In order to assist in the explanation of method 300, it will be assumed that method 300 may be performed by the apparatus 50a in the system 200. Indeed, the method 300 may be one way in which the apparatus 50a may be configured. Furthermore, the following discussion of method 300 may lead to a further understanding of the system 200 and its components. In addition, it is to be emphasized, that method 300 may not be performed in the exact sequence as shown, and various blocks may be performed in parallel rather than in sequence, or in a different sequence altogether.

Beginning at block 310, energy is to be stored in an energy storage device 60a. In the present example, the energy storage device 60a may be disposed in a base 55a of the apparatus 50a. The energy may receive power from a power source, such as an electrical outlet. Once sufficient energy is stored in the energy storage device 60a, the apparatus 50a is placed proximate or close to a user, such as on the same table at which the user is seated and within reach of the user.

Block 320 comprises transferring the energy stored in the energy storage device 60a to a portable electronic device 100 of the user via one of the charging devices 65a. For example, the user may select an appropriate connector from the charging device 65a-1 or the charging device 65a-2. Alternatively, the user may place the portable electronic device 100 on the charging device 65a-3 to wirelessly charge the portable electronic device 100. It is to be appreciated by a person of skill with the benefit of this description that by charging the portable electronic device 100, the user is engaged at the restaurant and unlikely to leave with the portable electronic device 100. Therefore, providing a charging device 65a will increase the dwell time of the user.

Block 330 comprises providing content to the user via a screen 70a to engage the user further. The content provided is not particularly limited and may be targeted to the user in some examples. In other examples, a large amount of content may be offered to the user, prompting the user to select content of interest. In this example, since the user has selected the content, the user may be more likely to engage with the content.

FIGS. 10A, 10B, 10C, 10D, 10E, and 10F show first side, second side, front side, back side, top, and bottom views of the apparatus to provide content to a user, respectively.

It is to be recognized that features and aspects of the various examples provided above may be combined into further examples that also fall within the scope of the present disclosure.

What is claimed is:

1. An apparatus comprising:
   a base to rest on a surface;
   an energy storage device disposed within the base;
   a charging device to couple with a portable electronic device of a user, wherein the charging device is to transfer energy stored in the energy storage device to the portable electronic device;
   a first screen mounted on the base, wherein the first screen is to provide content to the user to engage the user; and
   a second screen mounted on the base, wherein the first screen faces a different direction from the second screen, wherein a first bottom edge of the first screen is connected to a first side of the base, wherein a second bottom edge of the second screen is connected to a second side of the base opposite the first side, wherein the first screen and the second screen are connected along top edges to form a triangular hole with the base, and wherein the first screen and the second screen are to support the apparatus.

2. The apparatus of claim 1, further comprising an indicator light to provide an alert to an observer.

3. The apparatus of claim 2, wherein the indicator light is disposed above the first screen to be visible by the observer.

4. The apparatus of claim 1, wherein the first screen is a touchscreen to receive input from the user.

5. The apparatus of claim 4, further comprising a communications interface to transmit and receive signals.

6. The apparatus of claim 5, wherein the communications interface is to receive interactive content to be displayed to the user to increase user engagement.

7. The apparatus of claim 5, wherein the communications interface is to receive live content to be displayed to the user to increase user engagement.

8. A method comprising:
storing energy in an energy storage device, wherein the energy storage device is disposed in a base to rest on a surface proximate to a user;
transferring the energy stored in the energy storage device to a portable electronic device of a user, wherein transferring is to be carried out with a charging device; and
providing content to the user via a first screen mounted to the base and a second screen mounted to the base, wherein the content is to engage the user, wherein a first bottom edge of the first screen is connected to a first side of the base, wherein a second bottom edge of the second screen is connected to a second side of the base opposite the first side, wherein the first screen and the second screen are connected along top edges to form a triangular hole with the base, and wherein the first screen and the second screen are to support the apparatus.

9. The method of claim 8, further comprising activating an LED indicator light to provide an alert to an observer.

10. The method of claim 9, wherein the alert is to indicate a status of the energy storage device.

11. The method of claim 9, wherein the alert is to indicate a status of the charging device.

12. The method of claim 9, wherein the alert is to indicate a request for service by the user.

13. The method of claim 9, further comprising receiving input from the user at the first screen.

14. The method of claim 13, further comprising transmitting and receiving signals via a communications interface.

15. The method of claim 13, wherein receiving signals comprises receiving interactive content to be displayed to the user to increase user engagement.

16. The method of claim 13, wherein receiving signals comprises receiving live content to be displayed to the user to increase user engagement.

\* \* \* \* \*